United States Patent [19]

Green

[11] Patent Number: 4,824,222

[45] Date of Patent: * Apr. 25, 1989

[54] OXIDE BRONZE MATERIALS

[75] Inventor: Mino Green, London, United Kingdom

[73] Assignee: National Research Development Corporation, London, England

[*] Notice: The portion of the term of this patent subsequent to Mar. 1, 2005 has been disclaimed.

[21] Appl. No.: 902,751

[22] Filed: Sep. 2, 1986

[30] Foreign Application Priority Data

Sep. 2, 1985 [GB] United Kingdom ............... 8521753

[51] Int. Cl.$^4$ .............................................. G02F 1/01
[52] U.S. Cl. .................................................. 350/357
[58] Field of Search ............ 350/357; 252/600, 408.1

[56] References Cited

U.S. PATENT DOCUMENTS

| | | | |
|---|---|---|---|
| 4,231,641 | 11/1980 | Randin | 350/357 |
| 4,652,090 | 3/1987 | Uchikawa | 350/357 |
| 4,660,939 | 4/1987 | Tsuchiya | 350/357 |

FOREIGN PATENT DOCUMENTS

| | | | |
|---|---|---|---|
| 0007756 | 1/1977 | Japan | 350/357 |
| 0149019 | 11/1981 | Japan | 350/357 |
| 0072130 | 4/1983 | Japan | 350/357 |
| 2023867 | 11/1982 | United Kingdom . | |

Primary Examiner—Eugene R. LaRoche
Assistant Examiner—Nathan W. McCutcheon
Attorney, Agent, or Firm—Cushman, Darby & Cushman

[57] ABSTRACT

An oxide bronze host material is a solid solution of a first oxide component comprising molybdenum oxide ($MoO_3$), tungsten oxide ($WO_3$), zirconium oxide (ZrO), niobium oxide ($Nb_2O_5$) or any two or more thereof and a second oxide component comprising vanadium oxide ($V_2O_5$) and/or titanium oxide ($TiO_2$), the formula ratio of the first and second oxide components being selected such that the host material is capable of accepting guest atoms when incorporated in an electrochemical cell, said guest atoms altering the spectral characteristics of the host material without producing substantial visible color change in thin layers of the host material. Such a material may be used as a thin layer (12) in an electrochemical variable optical density window further including electrode layers (11, 15) on glass supports (10, 16) and an electrochromic oxide bronze layer (14) spaced from the layer (12) by an electrolyte layer (13a, 13b).

16 Claims, 1 Drawing Sheet

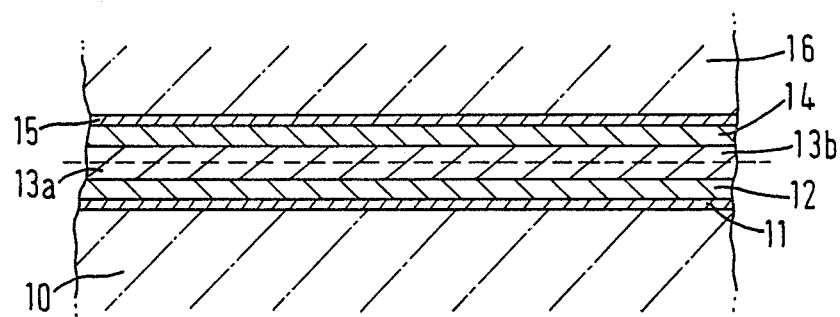

OXIDE BRONZE MATERIALS

FIELD OF THE INVENTION

The present invention relates to oxide bronze host materials, oxide bronzes based on such materials and devices made therefrom.

BACKGROUND OF THE INVENTION

Oxides of certain transition metals in their highest oxidation state exhibit the useful property that they are capable of acting as host materials to receive guest atoms such as hydrogen and alkali metal atoms. These may be reversibly accepted and given up by the oxide when made a component of a suitable electrochemical cell. The oxides undergo a change in light absorbency generally resulting in a visible colour change as the concentration of guest atoms therein varies. The best known examples of such materials are the tungsten bronzes in which the host material is tungsten oxide ($WO_3$). Tungsten bronzes are capable of reversibly receiving guest hydrogen or alkali metal atoms and exhibit a colour change in so doing. In the case of tungsten bronzes, the colour change of thin layers in transmitted light is from colourless to a blue colour of an intensity depending upon the concentration of the guest metal atoms. The introduction and removal of the guest atoms to and from the host oxide material may conveniently be achieved by setting up an electrochemical cell in which there is an electrode in connection with the oxide bronze, and electrolyte, preferably a solid electrolyte, a sink and source material for the guest atoms and a second electrode in connection with the sink and source materials. The material acting as a sink and source for guest atoms can conveniently be a second portion of oxide bronze material. The various components of the electrochemical cell can be conveniently be made in the form of thin layers deposited on a substrate.

Devices of this kind are known for use as display devices. They may also be employed to make variable transmission optical devices such as variable optical density windows. In this connection, the term "windows" is not restricted to windows for buildings although such windows are included. Rather, the term refers to any optical device through which light is to be transmitted.

If in such devices the guest atoms are hydrogen atoms, they can be derived from electrolysis of small quantities of water absorbed in the device. However, this presents substantial disadvantages in terms of the durability of the device.

Where the guest atoms are metal atoms, a difficulty arises in making a variable transmission optical device in that although the guest metal atoms may conveniently be transported from one layer to another of an eletrochemical cell, they would normally produce colouration in whichever oxide bronze layer of such a device they may for the moment occupy and known suitable source and sink materials other than oxide bronzes do not form colourless transparent layers suitable for use in devices of this kind.

In known dilute oxide bronzes, the colouration seen in transmission when a concentration of guest metal atoms is present in the oxide bronze is due to a light absorption band which peaks in the infra red but extends to some extent into the red end of the visible spectrum, thus producing a blue colouration effect.

BRIEF DESCRIPTION OF THE INVENTION

For use in variable transmission optical devices, it would be of great assistance to have available an oxide bronze material capable of forming thin essentially colourless layers which remain colourless even when containing a substatial concentration of guest atoms. Such an oxide bronze material would be capable of acting as a source and sink for guest atoms to be transferred to a second oxide bronze zone of an electrochemical cell as described above to produce a variable colouration is that second zone.

Different known oxide bronze materials exhibit variations between themselves in the position of the maximum intensity of the light absorption band produced by the presence of guest metal atoms. The position varies to some extent with the nature of the guest atom and more strongly with the nature of the host metal oxide. However, the differences in the maximum intensity of the band between known different oxide bronzes is relatively minor. The present invention is based upon a discovery that by producing a solid solution containing specific transition metal oxides, it is possible to produce an oxide bronze host material and oxide bronzes derived therefrom in which the light absorption band produced by the introduction of guest atoms is significantly different in position from the corresponding light absorption bands of known oxide bronzes so that the oxide bronze may form thin essentially colourless layers containing significant quantities of guest atoms.

Accordingly the present invention provides an oxide bronze material comprising a host oxide material containing guest atoms which can be reversibly removed from the host material when the host material is incorporated in a suitable electrochemical cell, which oxide bronze material has an absorption band for electromagnetic radiation which has an intensity dependent on the concentration of guest metal atoms in the oxide bronze material, and which material can be formed as thin, substantially transparent layers (e.g. up to 1 $\mu$m thick) which do not undergo any substantial visible colour change upon the reduction to substantially zero of said guest atom concentration.

Although such materials are useful in variable transmission optical devices of the kind referred to above, such materials may also be used in a wide variety of other electrochromic devices.

The invention includes an oxide bronze host material, transparent in thin layers (e.g. up to 1 $\mu$m thick) and capable of accepting guest metal atoms when incorporated in an electrochemical cell, said guest atoms altering the spectral characteristics of the host material without producing substantial visible colour change in thin layers of the host material.

BRIEF DESCRIPTION OF THE DRAWING

The DRAWING illustrates an electrochromic device incorporating a layer of an oxide bronze according to the invention shown schematically in cross-section.

DETAILED DESCRIPTION OF THE INVENTION

The invention provides in particular an oxide bronze host material which is a solid solution of a first oxide component comprising molybdenum oxide ($MoO_3$), tungsten oxide ($WO_3$), zirconium oxide ($ZrO_2$), niobium oxide ($Nb_2O_5$) or any two or more thereof and a second oxide component comprising vanadium oxide ($V_2O_5$) and/or titanium oxide ($TiO_2$), the formula ratio of the first and second oxide components being selected such that the host material is capable of accepting guest metal atoms when incorporated in an electrochemical cell, said guest metal atoms altering the spectral characteristics of the host material without producing substantial visible colour change in thin layers of the host material.

Preferably, the first oxide component is $MoO_3$ or $WO_3$. Preferably the second oxide component is $V_2O_5$.

The oxides mentioned above other than $MoO_3$, $V_2O_5$ and $WO_3$ are less convenient to fabricate into electrochromic devices, at least on a small scale, because of their higher boiling points.

Suitably the said formula ratio is from 10:1 to 1:10.

Preferably, the said ratio is from 3:1 to 1:3.

More preferably, said ratio is from 2:1 to 1:2.

More preferably, said ratio is approximately 1:1.

The said ratios are particularly preferred where the first and second oxide components are molybdenum or tungsten oxide and vanadium oxide. Such a host material can reversibly receive substantial quantities of a guest metal atom such as lithium whilst remaining apparently colourless at thicknesses up to say 1 μm, i.e. thicknesses quite adequate for use in many electrochromic devices.

As the proportions of first oxide component and second oxide component are varied in the solid solution from the ideal ratio for the chosen oxides, so the thickness at which films of the resulting oxide bronze begin to exhibit significant colouration decreases. Where for instance the oxides are of molybdenum and vanadium and the ratio is 1:1 the absorption maximum produced by the introduction of say lithium atoms in in the ultra violet in contra distinction to molybdenum oxide or tungsten oxide bronzes where it is in the infra red.

As one increases the proportion of molybdenum oxide with respect to vanadium oxide, so the absorption maximum will tend to move toward the visible so that there is a tendency for a pink colouration to be produced in transmission at sufficiently large layer thicknesses.

The invention includes an oxide bronze comprising a host material as described above and containing guest atoms producing a change in light absorption characteristics of the host material.

Preferably the guest atoms are hydrogen or alkali metal atoms.

Preferably, the guest atoms are lithium, sodium, or potassium atoms, with lithium being particularly preferred.

Preferably, the oxide bronze is of the general formula $$M^1{}_x(M^2O_a)_y(M^3O_b)_z$$

wherein $M^1$ is hydrogen or an alkali metal;

$M^2$ is molybdenum, tungsten, zirconium, niobium or a mixture of two or more thereof;

$M^3$ is vanadium and/or titanium;

a and b are sufficient to satisfy the valencies of $M^2$ and $M^3$ in their highest oxidation states;

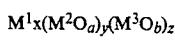

x is from 0.05 to 0.4, more preferably from 0.05 to 0.2. e.g. about 0.1.

Preferably, the oxide bronze is of the general formula $M_x(MoO_3)_y(V_2O_5)_z$ wherein $(y+z)=1$ and x is from 0.05 to 0.4, more preferably from 0.05 to 0.2, e.g. about 0.1.

In electrochromic devices, such oxide bronze host materials or oxide bronzes as are described above are used in the form of thin, preferably essentially colourless layers. Such layers will normally be transparent.

For many purposes, the thickness of the thin layer of such material in such a device will be up to about 1 μm, more preferably 0.1 to 0.5 μm, e.g. about 0.2 μm.

The invention includes electrochromic devices comprising an electrochemical cell including a layer of a first metal-sensitive compound capable of reversibly receiving guest atoms and which changes colour in so doing, a layer of a second metal-sensitive compound acting as a source of and sink for said guest atoms, and, between the said layers, a layer of an electrolyte in which a mobile charge carrier is an ion of said guest atoms so that said guest atoms are transferrable reversibly from the first metal-sensitive compound to the second metal-sensitive compound, wherein the layer of the second metal sensitive compound exhibits no substantial visible colour change with variation of the guest atom concentration therein.

Preferably, the electrolyte is a solid electrolyte which is a fast ion conductor in which a fast ion is an ion of one of the said guest atoms.

Normally, the electrochemical cell will further include first and second electrode layers between which the electrochromic material layer, electrolyte layer and said oxide bronze layer are disposed.

Devices of this kind may serve a variety of functions depending upon the nature of the materials used for making the various layers and in particular depending upon which of the layers are made transparent and which, if any, are made opaque.

Thus, devices according to the invention may serve as variable transmission optical devices or as various kinds of display device or data recording device.

In devices of the kind described, the electrochromic material may suitably be any of those so far known. In particular, oxide bronzes of a transition metal in its highest oxidation state such as an oxide of a transition metal which is tungsten oxide ($WO_3$), molybdenum oxide ($MoO_3$), vanadium oxide ($V_2O_5$), and niobium oxide ($Nb_2O_5$) and various solid solutions of two or more thereof.

The electrolyte is preferably a solid electrolyte. Examples of suitable materials are sodium-beta-alumina, polymeric/inorganic solid electrolytes containing an alkali metal, preferably of the kind known as Grenoble polymeric electrolytes, or solid electrolytes of the type known as Bordeaux-Glass.

The polymeric/inorganic solid electrolytes referred to above are described for example in the pioneer paper P. W. Wright (Br.Poly.J. 1975 7, 319–327) and in subsequent works. Preferred materials for such solid electrolytes include a combination of a polyethylene oxide or polypropylene oxide with an alkali metal compound. Depending upon the nature of the electrochromic device, the electrolyte may be rendered opaque by loading it with a suitable pigment or reflective material such as 5% by volume of $TiO_2$ powder in suspension.

The alkali metal compound may for instance be LiClO$_4$ or more preferably LiCF$_3$SO$_3$. Preferably, the polymer oxygen to lithium ratio is approximately 5.5 to 1 in the electrolyte.

A typical Bordeaux-Glass consists of a combination of LiCl, Li$_2$O, and B$_2$O$_3$.

A useful solid electrolyte is formed as what is probably in strict terms a hard gel from polymethylmethacrylate, propylene carbonate and lithium perchlorate as described in European Patent Specification No. 0098410.

Electrode layers may suitably be formed from indium tin oxide (ITO).

The fabrication of electrochromic devices to achieve good performance in the finished device needs to be carried out with care to ensure that aspects of the material used and their processing are properly controlled. British Patent Specification No. 2081922B sets out in detail the proper manner for fabricating devices of this general kind.

The invention will be illustrated by the following example with reference to the accompanying drawing which illustrates an electrochromic device incorporating a layer of an oxide bronze according to the invention shown schematically in cross-section.

EXAMPLE

A solid solution of molybdenum oxide (MoO$_3$) and vanadium oxide (V$_2$O$_5$) is formed by co-deposition in equi-molecular proportions of molybdenum oxide and vanadium oxide onto an indium tin oxide layer 11 already provided on a glass substrate 10. Suitable methods of co-depositing such oxides to form solid solutions are of course known. Generally, the conditions of deposition may be as set out in British Patent No. 2081922B.

The layer of electrochromic host material formed is indicated at 12 and is typically about 0.2 μm thick.

Optionally, lithium may be co-deposited with the molybdenum oxide and vanadium oxide to form layer 12 as a layer of oxide bronze comprising the host material with guest lithium atoms. Alternatively, the lithium may be put in in a subsequent step from lithium butyl to form the oxide bronze after the co-deposition step has produced the solid solution of host material.

To complete the device illustrated in the figure, one half of the final desired thickness of a polymer electrolyte such as (LiClO$_4$)(PEO)8 where PEO is a polyethylene oxide unit in a polymeric material typically having a molecular weight of about 5 million is coated over the oxide bronze material 12 to form half layer 13a.

Also prepared is a second glass substrate 16 bearing a layer 15 of indium tin oxide, a layer 14 of electrochromic material such as tungsten oxide and half layer 13b of the same electrolyte. The two electrolyte half layers are brought together to bond the two halves of the device together.

When an electrical potential of low voltage is applied between the two indium tin oxide electrode layers (11, 15) in an appropriate direction, lithium atoms may be driven from the layer 12 into the electrolyte and from the electrolyte into the electrochromic layer 14 to produce colouration of the layer 14. Reversal of the potential will reverse the flow of lithium atoms and hence bleach the colouration. It will be noted that the colouration of the tungsten oxide layer as perceived by a viewer is not affected by the change in guest lithium atom concentration in the layer of oxide according to the invention as this remains colourless throughout the process. The light absorption characteristics of this oxide layer do vary with guest atom concentration but the absorption band involved has its maximum intensity sufficiently far into the ultra violet that no visible change in the thin layer of oxide is produced.

Devices of this kind may be used for many different purposes such as display devices and variable optical density light transmitting members.

Whilst the invention has been described with reference to characteristics of the particular example described, it will be appreciated that many variations and modifications thereof may be made within the scope of the invention.

I claim:

1. An oxide bronze material comprising a host oxide material containing guest metal atoms which can be reversibly removed from the host material when the host material is incorporated in a suitable electrochemical cell, which oxide bronze material has an absorption band for electromagnetic radiation which has an intensity dependent on the concentration of guest metal atoms in the oxide bronze material, and which material can be formed as thin, substantially transparent layers which do not undergo any substantial visible color change upon the reduction to substantially zero of said guest atom concentration, wherein the host material is a solid solution of a first oxide component selected from the group consisting of molybdenum oxide (MoO$_3$), tungsten oxide (WO$_3$), zirconium oxide (ZrO$_2$), niobium oxide (Nb$_2$O$_5$) and mixtures of at least two thereof and a second oxide component selected from the group consisting of vanadium oxide (V$_2$O$_5$) titanium oxide (TiO$_2$ and mixtures thereof.

2. An oxide bronze as claimed in claim 1 wherein the guest atoms are alkali metal atoms.

3. An oxide bronze as claimed in claim 2 wherein the guest atoms are selected from the group consisting of lithium, sodium and potassium.

4. An oxide bronze of the general formula

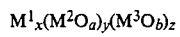

$$M^1{}_x(M^2O_a)_y(M^3O_b)_z$$

wherein

M$^1$ is an alkali metal;

M$^2$ is selected from the group consisting of molybdenum, tungsten, zirconium, niobium and mixtures of at least two thereof;

M$^3$ is selected from the group consisting of vanadium, titanium and mixtures thereof;

a and b are sufficient to satisfy the valencies of M$^2$ and M$^3$ in their highest oxidation states;

$y+z=1$; and x is from 0.05 to 0.4, which oxide bronze material has an absorption band for electromagnetic radiation which has an intensity dependent on the concentration of alkali metal atoms in the oxide bronze material, and which material can be formed as thin, substantially transparent layers which do not undergo any substantial visible color change upon the reduction to substantially zero of said alkali metal atom content X.

5. An oxide bronze as claimed in claim 4 of the general formula M$_x$(MoO$_3$)$_y$(V$_2$O$_5$)$_z$ wherein $(y+z)=1$, and x is from 0.05 to 0.4.

6. An oxide bronze as claimed in claim 5 wherein x is from 0.05 to 0.2.

7. An oxide bronze as claimed in claim 5 wherein x is about 0.1.

8. An electrochromic device comprising an electrochemical cell including a layer of a first metal-sensitive compound capable of reversibly receiving guest metal atoms and which changes color in so doing, a layer of an oxide bronze material acting as a source of and sink for said guest atoms, and, between the said layers, a layer of an electrolyte in which a mobile charge carrier is an ion of said guest atoms so that said guest atoms are transferrable reversibly from the first metal-sensitive compound to the oxide bronze material wherein the layer of said oxide bronze material exhibits no substantial visible color change upon the substantial variation of the guest atom concentration therein, and comprises a host of material for said guest atoms which is a solid solution of a first oxide component selected from the group consisting of molybdenum oxide ($MoO_3$), tungsten oxide ($WO_3$), zirconium oxide ($ZrO_2$), niobium oxide ($Nb_2O_5$) and mixtures of at least two thereof and a second oxide component selected from the group consisting of vanadium oxide ($V_2O_5$) titanium oxide ($TiO_2$) and mixtures thereof.

9. An electrochromic device as claimed in claim 8 wherein the electrolyte is a solid electrolyte which is a fast ion conductor in which a fast ion is an ion of said guest atoms.

10. An electrochromic device as claimed claim 8 further comprising first and second electrode layers between which the electrochromic material layer, electrolyte layer and said oxide bronze layer are disposed.

11. An oxide bronze material as claimed in claim 1 wherein the first oxide component is selected from the group consisting of $MoO_3$ and $WO_3$.

12. An oxide bronze material as claimed in claim 11 wherein the second oxide component is $V_2O_5$.

13. An oxide bronze material as claimed in claim 1 wherein the formula ratio of said first and second oxide components is from 10:1 to 1:10.

14. An oxide bronze material as claimed in claim 13 wherein the said ratio is from 3:1 to 1:3.

15. An oxide bronze material as claimed in claim 14 wherein said ratio is approximately 1:1.

16. An oxide bronze material as claimed in claim 1 which is a solid solution comprising $MoO_3$ and $V_2O_5$, the formula ratio of $MoO_3$ to $V_2O_5$ being from 3:1 to 1:3.

* * * * *